US006257777B1

(12) United States Patent
Myers et al.

(10) Patent No.: US 6,257,777 B1
(45) Date of Patent: Jul. 10, 2001

(54) PHOTOGRAPHIC ROLL FILM

(75) Inventors: Keith D. Myers, Rochester; Mari C. Fiore, Webster, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/439,768

(22) Filed: Nov. 15, 1999

(51) Int. Cl.$^7$ .............................. G03B 17/26; G03C 3/02

(52) U.S. Cl. .......................... 396/511; 430/501; 206/410; 206/455; 206/389

(58) Field of Search .................................... 396/511, 512, 396/641, 513; 206/410, 389, 542, 813; 430/501

(56) References Cited

U.S. PATENT DOCUMENTS

| | | | |
|---|---|---|---|
| 1,454,812 | 5/1923 | Jones | 430/501 |
| 1,454,813 | 5/1923 | Jones | 430/500 |
| 1,454,814 | 5/1923 | Jones | 430/501 |
| 1,991,442 | 2/1935 | Barenyi | 430/501 |
| 2,188,779 | 1/1940 | Roehrl | 206/813 |
| 3,022,170 | 2/1962 | Flinchbaugh et al. | 430/501 |
| 3,647,465 | 3/1972 | Shamay | 430/501 |
| 3,986,879 | 10/1976 | Klinkhammer | 430/501 |
| 4,911,299 * | 3/1990 | Peeters | 206/410 |
| 5,492,221 * | 2/1996 | Light et al. | 206/410 |
| 5,790,912 | 8/1998 | Myers | 396/511 |
| 5,918,083 * | 6/1999 | Aoki et al. | 396/511 |
| 6,100,017 | 8/2000 | Makino et al. | 430/501 |

FOREIGN PATENT DOCUMENTS

| | | | |
|---|---|---|---|
| 0 828 186 A1 | 3/1998 | (EP) | G03C/3/02 |
| 1 126 754 | 9/1968 | (GB) | G03C/3/02 |

OTHER PUBLICATIONS

Product Information, Scotch brand Joining systems (3M) "A–25, Acrylic Adhesive Family," Jan. 1989.

* cited by examiner

*Primary Examiner*—D. Rutledge
(74) *Attorney, Agent, or Firm*—Susan L. Parulski

(57) ABSTRACT

A photographic film roll. The roll includes a length of photosensitive web material wound about a spool and a light-shielding member wound about the length of photosensitive web material. The light-shielding member includes a transverse fold line spaced from one end of the light-shielding member defining a tongue portion. Applied on an exterior side of the tongue portion is an adhesive. The adhesive tongue portion is bondable to an exterior side of an underlying convolution of the light-shielding member when the light-shielding member is wound about the length of photosensitive web material.

11 Claims, 5 Drawing Sheets

PHOTOGRAPHIC ROLL FILM

FIELD OF THE INVENTION

The present invention relates generally to photographic film and light-tight packaging, and more particularly to methods for securing or sealing closed a light-shielding member of a roll of photographic film.

BACKGROUND OF THE INVENTION

Rolls of light sensitive web material (such as photographic paper and film) require light-tight packaging so that such rolls are not exposed to white or room light whereby the light sensitive characteristics of the rolls would be adversely effected.

A known method of light shielding an unexposed roll of photographic film is shown in FIG. 1. As shown, a spool 10 includes a core 12 and a pair of flanges 14,16 disposed at opposite ends of core 12. Web material W is wound between the flanges 14, 16. A light-shielding opaque member 18 is attached to web material W, for example by means of an adhesive tape 19, and wound about the web material W to shield the web material W from light.

With the light-shielding member wound about the film roll, a variety of securing or sealing means may be employed for sealing closed the light-shielding member of an unexposed photographic film roll. U.S. Pat. No. 5,790,912 (Myers) commonly assigned and incorporated herewith by reference, relates to a tear-out region having an adhesive which bonds to an underlying convolution of the light-shielding member. Other means for sealing closed a light-shielding member of an unexposed photographic film roll are disclosed in U.S. Pat. No. 2,188,779 (Roehrl), U.S. Pat. No. 3,022,170 (Flinchbaugh), and U.S. Pat. No. 3,986,879 (Klinkammer).

After the photographic film roll has been exposed, for example, using a camera (not shown), the exposed photographic film may be rewound onto the spool. Alternatively, the exposed film may be wound onto another, different spool. If wound onto another spool, the light-tight packaging may include a light-shielding member arranged to light shield the wound roll of photographic film.

U.S. Pat. No. 1,454,812 (Jones), U.S. Pat. No. 1,454,813 (Jones), and U.S. Pat. No. 1,454,814 (Jones), all commonly assigned and incorporated herewith by reference, relate to a roll package having such an arrangement. As shown in FIG. 2, a roll package includes a light-shielding leader 20 disposed at one end of the web material W, and a light-shielding trailer 22 disposed at the other end of the web material W, with the light-shielding trailer 22 being engaged to spool 10, for example by a slot (not shown). Accordingly, when the unexposed web material W is wound about spool 10 between end flanges 14,16, trailer 22 is first wound, then the web material W is wound, with leader 20 being wound about the web material W. After exposure, the exposed web material W is wound onto another spool such that leader 20 is first wound about the spool, then the exposed web material W is wound, with trailer 22 being wound about the exposed web material W. Such a film roll configuration (i.e., trailer/web/leader) has been generally referred to as 220 format film roll.

Another film roll adapted for winding of exposed web material W onto another spool after exposure is illustrated in FIG. 3, and generally referred to as a 120 format film roll. As illustrated, a light-shielding backing material 24 is disposed on one side of the web material W along the entire length of the web material W, with a length of light-shielding backing material 24 being greater than the length of the web material W. The backing material may extend beyond the web material W at both ends. Accordingly, when the web material W and light-shielding backing material 24 are wound onto the spool 10 between the flanges 14, 16, the wound convolutions alternate between the web material W and the light-shielding backing material 24.

A variety of securing or sealing means may be employed for securing or sealing closed the light-shielding member of an exposed photographic film roll.

U.S. Pat. No. 1,991,442 (Barenyi) discloses a strip of gummed paper attached to the end of a protective backing strip wherein the gummed strip is used to fix the exposed film in position on a film receiving spool. One portion of the gummed strip is attached to the backing strip and another portion lies loose with its outer portion on the backing strip. The gummed strip is exposed by tearing off an end of the backing strip.

U.S. Pat. No. 3,647,465 (Shamay) discloses a paper wrapper strip attached to an outer end of a masking strip with the legend EXPOSED which is displayed when the exposed film is wound on the spool.

Some known photographic film rolls include a light-shielding member 28 having a tongue 30 and a gummed strip 32 as illustrated in FIG. 4. A first portion 34 of gummed strip 32 is attached to light-shielding member 28 and a second portion 36 is not attached to light-shielding member 28. Second portion 36 comprises a moisture-activated adhesive on its inner side. To secure the photographic film roll, light-shielding member 28 is wound about spool 10 and tongue 30 is folded back under itself, for example along transverse line 38. Second portion 36 is round about the roll and secured to light-shielding member 28 after the adhesive is moisture activated. The resulting wound roll is illustrated in FIG. 5.

The strips of these references are generally referred to as an "after exposure label" or "exposure label" since the strip is applied to the roll film after exposure to support the film in a roll shape for transport to a developer. An optional legend "EXPOSED" on the strip indicates to a user that the roll film has been exposed.

While such after exposure labels may have achieved certain degrees of success in their particular application, currently, the after exposure labels are activated by moisture or application of a liquid, for example by licking. Unfortunately, the flavoring of such "lick-n-stick" labels has been considered to be offensive by users.

Accordingly, a need continues to exist for a means for sealing a roll of exposed photographic film which does not require a liquid or moisture for activation, provides secure closure of the roll, and is not photoactive. Further, the means for sealing must not adversely affect the photosensitive characteristics of the film, such as impressions resulting from discontinuous edges or thick material areas.

SUMMARY OF THE INVENTION

An object of the present invention is to provide a means for sealing roll of photographic film which does not require a liquid or moisture for activation.

Another object of the invention is to provide such a means for sealing a roll of exposed photographic film and providing an EXPOSED legend.

Still another object of the invention is to provide such a means for sealing which does not adversely affect the photosensitive characteristics of the film.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a photographic film roll comprising a length of photosensitive web material wound about a spool. A light-shielding member is wound about the length of photosensitive web material, and includes an exterior side. The light-shielding member further includes a transverse fold line spaced from one end of the light-shielding member to define a tongue portion. Applied on the exterior side of the tongue portion is an adhesive. The adhesive tongue portion is bondable to the exterior side of an underlying convolution of the light-shielding member when the light-shielding member is wound about the length of photosensitive web material.

According to another aspect of the invention, there is provided a photographic film roll comprising a length of photosensitive web material wound about a spool. A light-shielding member is wound about the length of photosensitive web material. The light-shielding member includes a sealing region on an exterior side of the light-shielding member spaced from one end of the light-shielding member. An adhesive is applied to the sealing region, whereby the sealing region is bondable to an interior side of an overlapping convolution of the light-shielding member when the light-shielding member is wound about the length of photosensitive web material.

The present invention provides a means for sealing a roll of potographic film comprising an exposure label made of a light-shielding member having a pressure sensitive adhesive thereon which does not require a liquid or moisture for activation.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
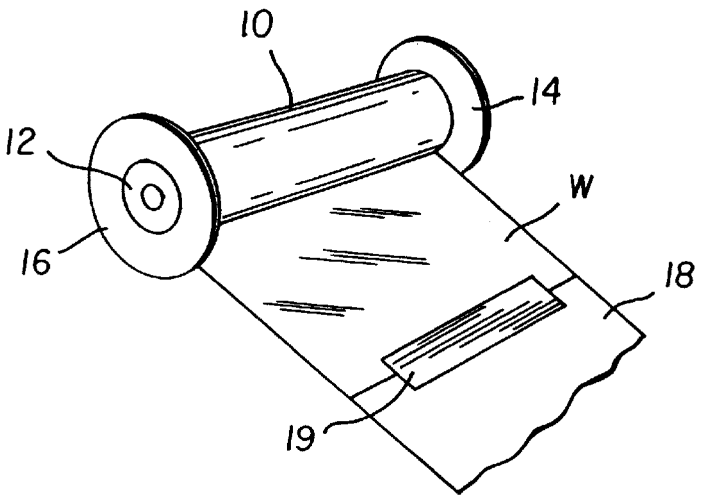
FIG. 1 (Prior Art)
FIG. 1 shows a perspective view of a prior art photographic film roll including a spool having a core and a pair of end flanges, a web material, and an opaque light-shielding member attached to the web material.
Figure 2:
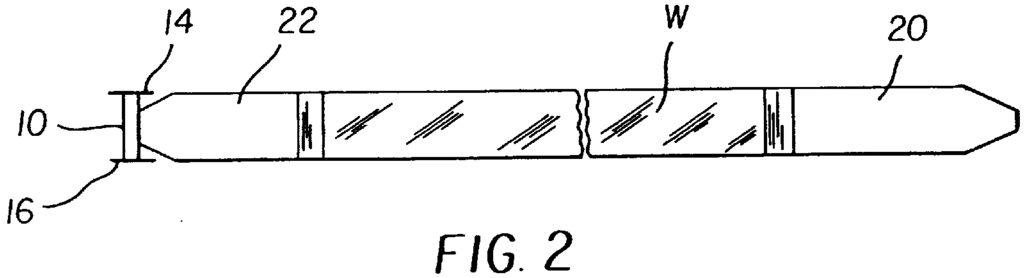
FIG. 2 (Prior Art)
FIG. 2 shows a top view of a prior art photographic film roll including a spool, a trailer, web material, and a leader.
Figure 3:
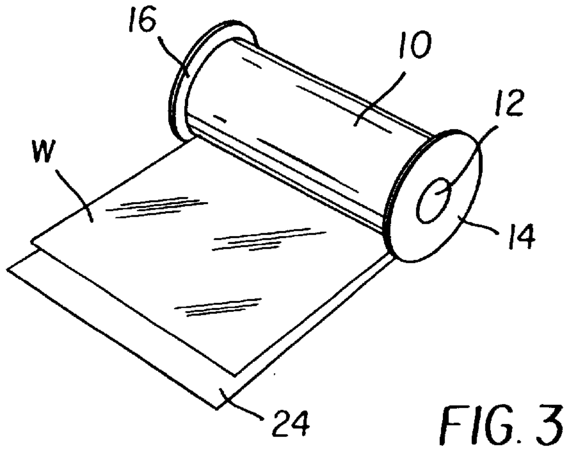
FIG. 3 (Prior Art)
FIG. 3 shows a perspective view of a prior art photographic film roll including a spool, web material, and a light-shielding backing material.
Figure 4:
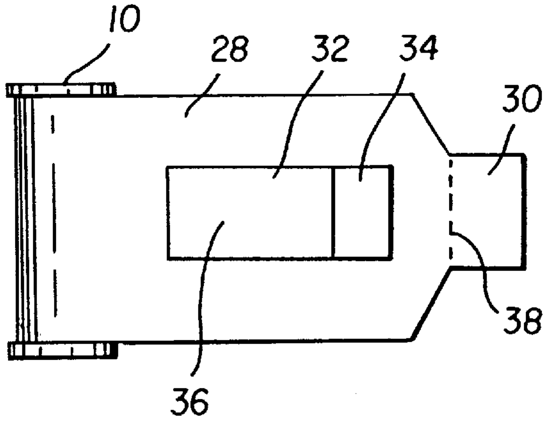
FIG. 4 (Prior Art)
FIG. 4 shows a top view of a prior art photographic film roll including a spool, web material, a light-shielding member, and a gummed strip defining an after-exposure label.
Figure 5:
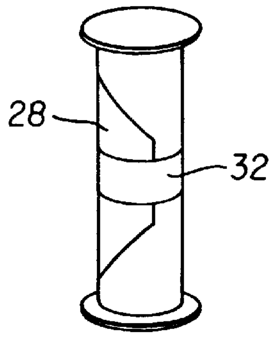
FIG. 5 (Prior Art)
FIG. 5 shows a perspective view of the prior art photographic film roll of FIG. 4 wherein the after exposure label is applied.

The following is a detailed description of the preferred embodiments of the invention, reference being made to the drawings in which the same reference numerals identify the same elements of structure in each of the several figures.

FIGS. 6–9 illustrate a roll 100 in accordance with a first embodiment of the present invention. Roll 100 comprising a spool 110 and a length 120 of photosensitive web material W tightly wound about the spool 110.

Figure 6:
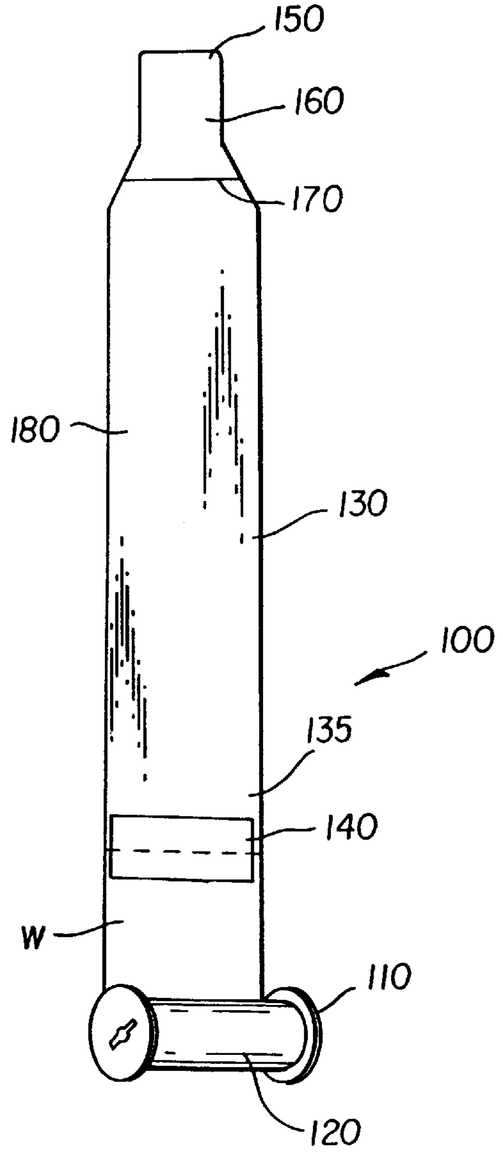
FIG. 6 shows a perspective view of a photographic film roll in accordance with the present invention.
Figure 7:
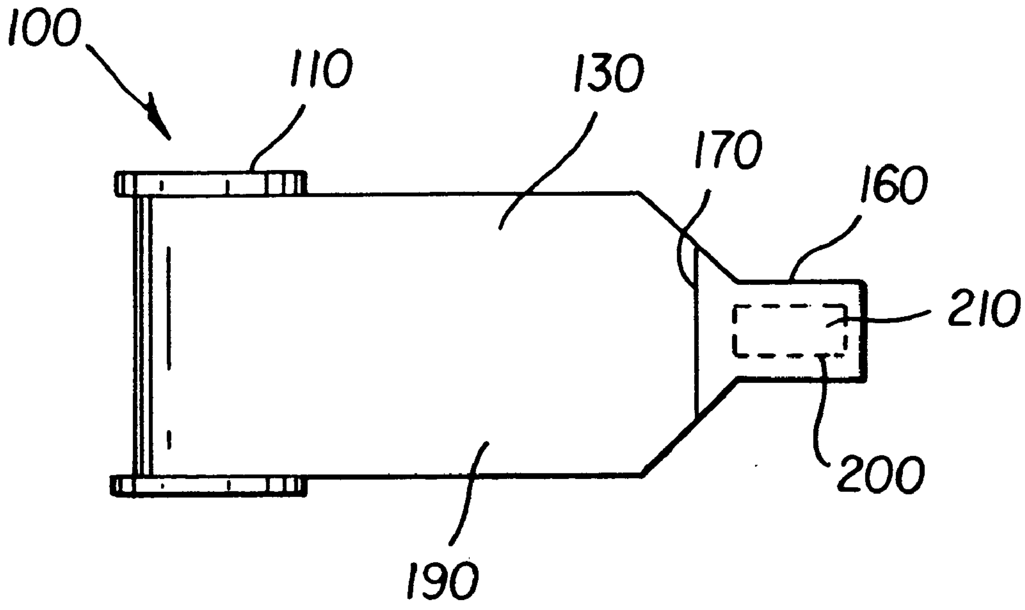
FIG. 7 shows a top view of a first embodiment of a photographic film roll in accordance with the present invention.
Figure 8:
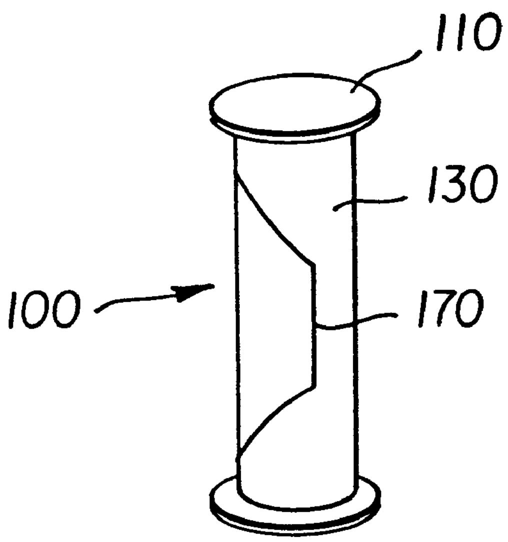
FIG. 8 shows a perspective view of the first embodiment of the photographic film roll according to FIG. 7 wherein the light-shielding member is secured to form a roll package.

Roll 100 includes a light-shielding member 130 wound about the length 120 of photosensitive web material W. Light-shielding member 130 may be comprised of paper or poly film material or other opaque material suitable for shielding the photosensitive web material W from exposure to light and should have a length to create at least 1.5 convolutions. Light-shielding member 130 may optionally include an extended liner (not shown) to provide a user with an edge for grasping the light-shielding member 130. Further, light-shielding member 130 may optionally include a legend or other printed matter, for example, "EXPOSED," or instructions regarding how to use the feature. Light-shielding member 130 may be attached to an end of the length 120 of web material W by known means of butt-splicing a proximal end 135 of light-shielding member 130 with the web material W by means of an adhesive tape 140, as shown in FIG. 6, or by other means well known in the art.

A distal end 150 of light-shielding member 130 preferably includes a tongue portion 160 which is preferably narrower in width than light-shielding member 130 or has a taper. Such a preferred arrangement of tongue portion 160 would define a spool-engaging portion adapted to engage a slot (not shown) in spool 110 for winding. A fold line 170 disposed transversely on light-shielding member 130 and spaced from distal end 150 defines tongue portion 160.

Light-shielding member 130 includes a first side 180 defining an interior surface, and a second side 190 defining an exterior surface. The exterior surface of tongue portion 160 includes a sealing region 200 thereon. An adhesive 210 is applied to sealing region 200. Sealing region 200 may be of any size and shape. For example, sealing region 200 may have a rectangular shape of a size of 0.5×1.25 inches up to 0.75×1.25 inches.

While a moisture or liquid-activated adhesive may be suitable for the present invention, Applicants prefer an adhesive which does not require moisture or a liquid for activation. Such a suitable adhesive would be a pressure sensitive adhesive (e.g., pressure sensitive tape), a permanent adhesive, a cohesive material, an adhesive transfer tape, a double-sided tape (with or without liner materials), a rubber or acrylic based adhesive, or a removable/repositionable tape. For example, a pressure sensitive adhesive could include a backing material (also generally referred to as a release liner) which is "peeled away" to reveal the pressure sensitive adhesive. Another example of a suitable adhesive is an acrylic adhesive, such as the A-25 Acrylic Adhesive Family from 3M, which is a firm acrylic pressure-sensitive adhesive system. Adhesive 210 preferably has a thickness in the range of about 0.0025 to about 0.0075 inches, so as to not provide pressure marks on the film from winding. Further, adhesive 210 must be suitable for photoactivity. Application of the adhesive 210 may be by means known to those skilled in the art, including but not limited to rotogravure roll, thermal bonding, pressure, pressure and time, or ultrasonic welding, and may include a multi-step process.

Figure 9A:
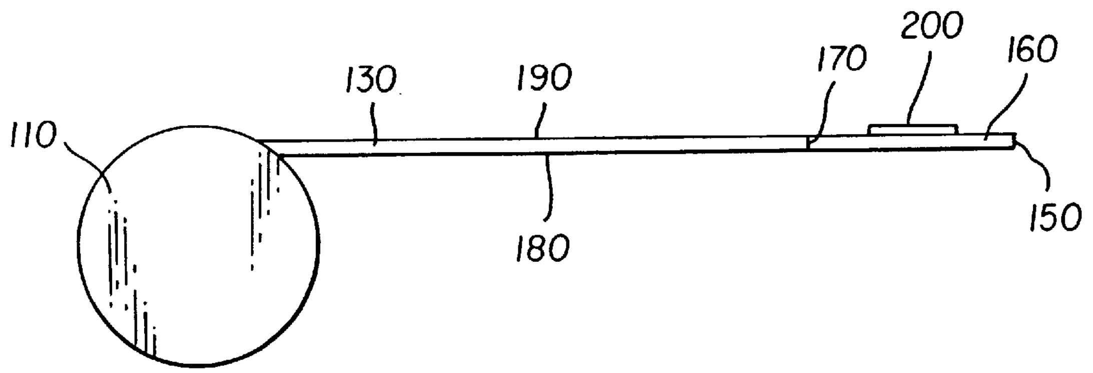
FIGS. 9(*a*) through 9(*c*) show a side view of the first embodiment of the photographic film roll according to FIG. 7 illustrating the winding of the film roll.
Figure 9B:
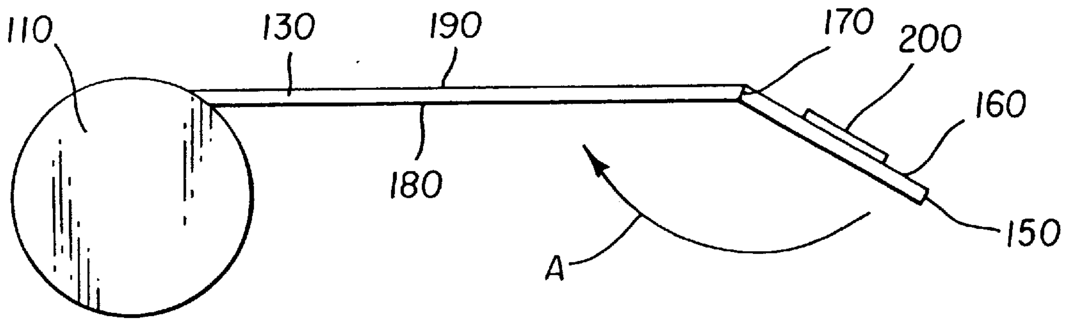
Figure 9C:
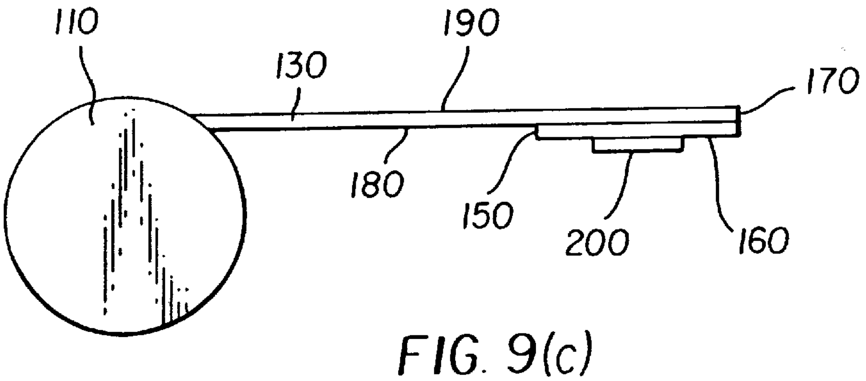
Figure 10:
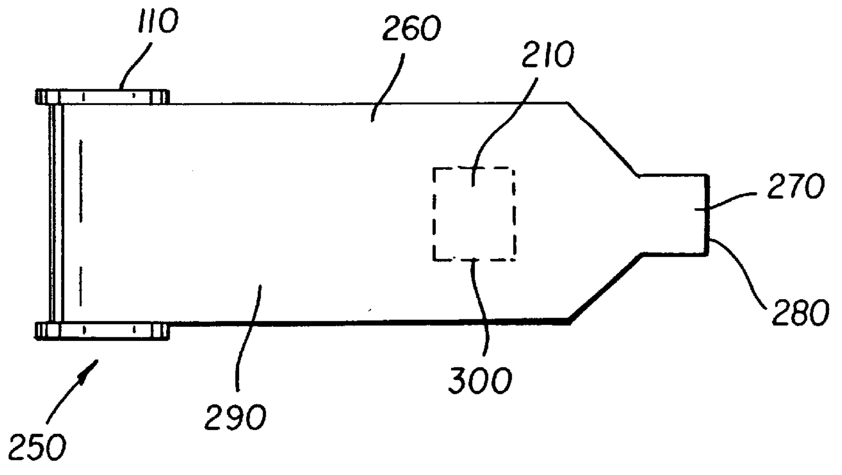
FIG. 10 shows a top view of a second embodiment of a photographic film roll in accordance with the present invention.
Figure 11:
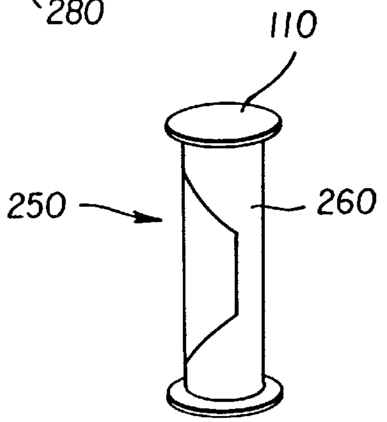
FIG. 11 shows a perspective view of the second embodiment of the photographic film roll according to FIG. 9 wherein the light-shielding member is secured to form a roll package.
Figure 12:
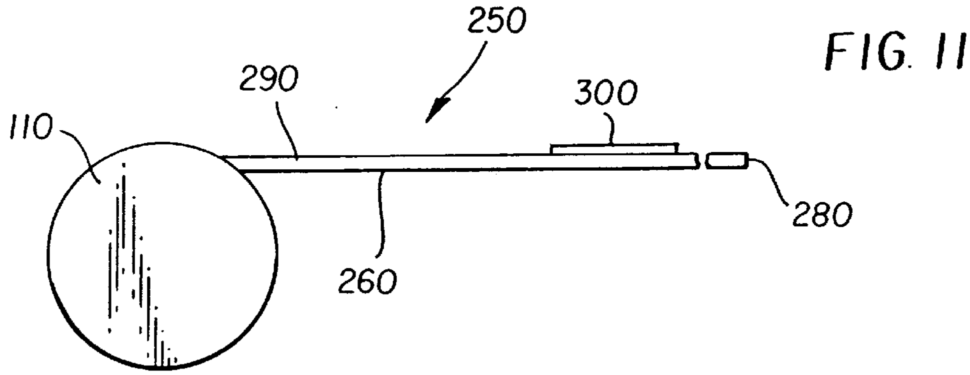
FIG. 12 shows a side view of the second embodiment of the photographic film roll according to FIG. 9.
Figure 13:
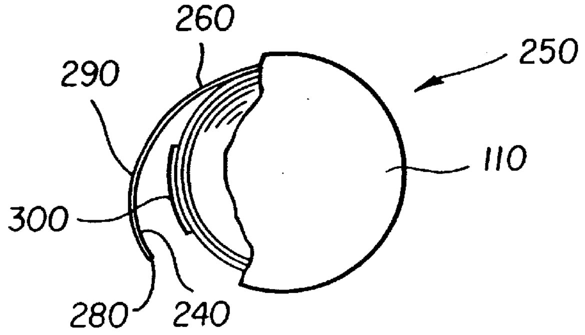
FIG. 13 shows a side view of the second embodiment of the photographic film roll according to FIG. 9.

As best illustrated in FIGS. 9(*a*) through 9(*c*), a user of roll 100 winds the length of photosensitive web material 120 about spool 110, and then winds light-shielding member 130 about the length of photosensitive web material 120. Tongue portion 160 is folded along fold line 170 and back under light-shielding member 130 (as shown by arrow A in FIG. 9(*b*)) such that sealing region 200 is facing an exterior surface of an underlying convolution of the light-shielding member 130. As such, sealing region 200 is dispose the exterior surface of the underlying convolution. For example, if sealing region 200 comprises a pressure sensitive adhesive, applying pressure to the folded tongue portion would securely close the light-shielding member 130. To uncoil roll 100, a user grasps tongue portion 160 at fold line 170. A lifting action will cause the tongue portion 160 to separate from the underlying convolution.

FIGS. 10–13 illustrate a roll 250 in accordance with a second embodiment of the present invention. Roll 250 comprising spool 110 and a length of photosensitive web material (not shown) tightly wound about the spool 110. Roll 250 includes light-shielding member 260 wound about the length of photosensitive web material. Similar to roll 100, light-shielding member 260 of roll 250 may be attached to an end of the length of web material by known means of butt-splicing a proximal end of light-shielding member 260 with the web material by means of an adhesive tape or by other means well known in the art.

Light-shielding member 260 may optionally include a tongue portion 270 disposed at one end 280 of the light-shielding member 260. Tongue portion 270 may be narrower in width than light-shielding member 260 or have a taper to define a spool-engaging portion adapted to engage a slot (not shown) in spool 110 for winding.

Light-shielding member 260 includes a first side defining an interior surface 240, and a second side 290 defining an exterior surface 290. On the exterior surface of the light-shielding member 260, spaced from one end 280 and inboard from tongue portion 270, is a sealing region 300 thereon. Adhesive 210 is applied to sealing region 300. Sealing region 300 may be of any size and shape. For example, sealing region 300 may have a rectangular shape having a size of 0.5×1.25 inches up to 0.75×1.25 inches. Sealing region 300 is disposed at a distance of at least one convolution from one end 280 of light-shielding member 260. Preferably, sealing region 300 is disposed at a distance of at least about one to about 1.5 convolutions from one end 280 of light-shielding member 260.

A user of roll 250 winds the length of photosensitive web material about spool 110, and then winds light-shielding member 260 about the length of photosensitive web material. As one end 280 is wrapped about an underlying convolution, sealing region 300 is facing the interior surface 240 of an overlapping convolution of the light-shielding member 260. As such, sealing region 300 is disposed for bonding with the interior surface 240 of the overlapping convolution. If sealing region 300 comprises a pressure sensitive adhesive, applying pressure to the convolution overlapping sealing region will securely close the light-shielding member 260. To uncoil roll 250, a user grasps tongue portion 270. A lifting action will cause the tongue portion 270 to separate from the underlying convolution.

While the embodiments of the present invention have been described with regard to attachment of the light-shielding member to the length of web material, alternatively, the light-shielding members may be arranged relative to the web material as described above with regard to conventional, well-known 120 format film roll and 220 format film roll. For example, light-shielding member may be a backing paper which extends beyond the web material at both ends to create a leading and trailing end. The present invention as described above may be used with these film roll configurations.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

W web material
10 spool
12 core
14 flange
16 flange
18 light-shielding opaque member
19 adhesive tape
20 light-shielding leader
22 light-shielding trailer
24 light-shielding backing material
28 light-shielding member
30 tongue
32 gummed strip
34 first portion of gummed strip
36 second portion of gummed strip
38 transverse line
100 roll
110 spool
120 length of photosensitive web material
130 light-shielding member
135 proximal
140 adhesive tape
150 distal end
160 tongue portion
170 fold line
180 first side of light-shielding member
190 second side of light-shielding member
200 sealing region
210 adhesive PARTS LIST—Continued

240 first, interior surface of light-shielding member
250 roll

260 light-shielding member
270 tongue portion
280 end of light-shielding member
290 second, exterior surface of light-shielding member
300 sealing region

What is claimed is:

1. A photographic film roll, comprising:

a length of photosensitive web material wound about a spool; and a light-shielding member wound about the length of photosensitive web material, the light-shielding member having an exterior side, the light-shielding member having a transverse fold line spaced from one end of the light-shielding member to define a tongue portion, the exterior side of the tongue portion having an adhesive applied thereon and is bondable to the exterior side of an underlying convolution of the light-shielding member when the light-shielding member is wound about the length of photosensitive web material.

2. The photographic film roll according to claim 1 wherein the adhesive is a pressure sensitive adhesive.

3. The photographic film roll according to claim 1 wherein the adhesive is selected from the group comprising: a pressure sensitive adhesive, a permanent adhesive, a cohesive adhesive, an adhesive transfer tape, a double-sided tape, a rubber or acrylic based adhesive, and a removable/repositionable tape.

4. A photographic film roll, comprising:

a length of photosensitive web material wound about a spool;

a light-shielding member wound about the length of photosensitive web material, the light-shielding member having a tongue portion disposed at one end of the light-shielding member, the tongue portion having a sealing region disposed on an exterior side of the light-shielding member; and an adhesive applied to the sealing region, the tongue portion being foldable along a transverse line, the sealing region being bondable to an exterior side of an underlying convolution of the light-shielding member when the light-shielding member is wound about the length of photosensitive web material.

5. The photographic film roll according to claim 4 wherein the adhesive is a pressure sensitive adhesive.

6. The photographic film roll according to claim 4 wherein the adhesive is an acrylic based pressure sensitive adhesive.

7. A photographic film roll, comprising:

a length of photosensitive web material wound about a spool; and a light-shielding member wound about the length of photosensitive web material, the light-shielding member having an exterior side, the light-shielding member having a transverse fold line spaced from one end of the light-shielding member to define a tongue portion, the exterior side of the tongue portion having an adhesive applied thereon and is bondable to the exterior side of an underling convolution of the light-shielding member when the light-shielding member is wound about the length of photosensitive web material, the adhesive having a thickness in the range of about 0.0025 to about 0.0075 inches.

8. A photographic film roll, comprising:

a length of photosensitive web material wound about a spool;

a light-shielding member wound about the length of photosensitive web material, the light-shielding member having a tongue portion disposed at one end of the light-shielding member, the tongue portion having a sealing region disposed on an exterior side of the light-shielding member; and an adhesive applied to the sealing region, the tongue portion being foldable along a transverse line, the sealing region being bondable to an exterior side of an underlying convolution of the light-shielding member when the light-shielding member is wound about the length of photosensitive web material, the adhesive having a thickness in the range of about 0.0025 to about 0.0075 inches.

9. A photographic film roll, comprising:

a length of photosensitive web material wound about a spool;

a light-shielding member wound about the length of photosensitive web material, the light-shielding member having a sealing region on an exterior side of the light-shielding member spaced from one end of the light-shielding member; and an adhesive applied to the sealing region, the sealing region being bondable to an interior side of an overlapping convolution of the light-shielding member when the light-shielding member is wound about the length of photosensitive web material, the adhesive having a thickness in the range of between about 0.0025 to about 0.0075 inches.

10. The photographic film roll according to claim 9 wherein the sealing region is spaced from one end of the light-shielding member by at least one convolution.

11. A photographic film roll, comprising:

a length of photosensitive web material wound about a spool;

a light-shielding member wound about the length of photosensitive web material, the light-shielding member having a sealing region on an exterior side of the light-shielding member spaced from one end of the light-shielding member, one end of the light-shielding member including a tongue portion, and the sealing region is inboard of the tongue portion; and an adhesive applied to the sealing region, the sealing region being bondable to an interior side of an overlapping convolution of the light-shielding member when the light-shielding member is wound about the length of photosensitive web material.

* * * * *